Patented Jan. 2, 1951

2,536,339

UNITED STATES PATENT OFFICE 2,536,339

PLASTIC COMPOSITIONS CONTAINING CORN PROTEINS AND METHOD OF MAKING

Lawrence A. Wood, Jr., and Eugene D. O'Mahony, Indianapolis, Ind., assignors to Radio Corporation of America, a corporation of Delaware No Drawing. Application June 29, 1948, Serial No. 35,975

6 Claims. (Cl. 106—37)

This invention relates to moldable compositions containing corn protein and to articles made therefrom. More particularly, this invention relates to moldable compositions containing corn protein and a particular dispersing agent, namely, orthonitrobiphenyl.

There have been many previous attempts to make moldable materials such as phonograph records from plastic compositions including corn protein materials. However, it has been found very difficult to mix the proteins with other desirable and necessary ingredients used in making phonograph records. Some of these ingredients are rosin, the gasoline insoluble aromatic hydrocarbon soluble resinous extract of pinewood, various mold lubricants, plasticizers, fillers, etc. Mixing all of these ingredients with the protein in a mill or Banbury type mixer does not produce the degree of dispersion required in the making of good quality phonograph records.

One object of the present invention is the formulation of improved compositions containing both corn protein and the gasoline insoluble aromatic hydrocarbon soluble resinous extract of pinewood.

Another object of the present invention is to provide an improved method of dispersing corn protein into a premix material which is later to be molded under heat and pressure.

Another object of this invention is to provide an improved phonograph record.

Another object of this invention is to provide an improved moldable composition which may be premixed in any of various types of mixing equipment under widely ranging temperature conditions.

Still another object of the invention is to provide a resin-protein premix much lower in viscosity than those previously made with water as a dispersing agent.

One preferred example of a composition made according to the present invention is as follows:

Part A.—The premix

The following ingredients in the proportions specified may be mixed in a Banbury or other intensive mixer at elevated temperatures until the material is fused and blended thoroughly:

| | Per cent |
|---|---|
| Zein (corn protein) | 35.7 |
| Gasoline insoluble aromatic hydrocarbon soluble resinous extract of pinewood | 54.6 |
| Orthonitrobiphenyl | 9.7 |

This mix is allowed to cool and is then further mixed and milled with the ingredients of part B until blending is complete to form a molding composition suitable for making phonograph records.

Part B

| | Per cent |
|---|---|
| Premix from Part A | 20.75 |
| Gasoline insoluble aromatic hydrocarbon soluble resinous extract of pinewood | 8.75 |
| Zinc stearate | 1.0 |
| Carbon black | 2.0 |
| Wax | 1.0 |
| Copal gum | 1.0 |
| Red slate filler | 30.5 |
| Pulverized limestone | 35.0 |

The composition of part A may be varied within wide limits, depending on the final composition desired in part B and also depending upon the characteristics of the mixing equipment employed. For example, the ingredients of part A may be varied as follows:

| | Per cent |
|---|---|
| Zein | 30 to 60 |
| Gasoline insoluble aromatic hydrocarbon soluble resinous extract of pinewood | 37.5 to 60 |
| Orthonitrobiphenyl | 2.5 to 12 |

It is obvious that the formulation of part B may also be varied according to the qualities desired in the final molded product. If the molded product is a phonograph record, the ingredients of part B may be varied as follows:

| | Per cent |
|---|---|
| Premix of Part A | 18 to 28 |
| Gasoline insoluble aromatic hydrocarbon soluble resinous extract of pinewood | 0 to 15 |
| Zinc stearate | 0.5 to 2 |
| Carbon black | 0 to 5 |
| Wax | 0.5 to 3 |
| Copal gum | 0 to 3 |
| Red slate filler | 30 to 35 |
| Pulverized limestone | 30 to 35 |

Besides varying the percentages of each of the ingredients listed above, it is obvious that substitutes of equivalent materials can be made for each one. For example, the zinc stearate may be replaced by other metallic stearates or other metallic compounds of the long chain fatty acids. Carbon black may be entirely replaced with other coloring materials and various waxes may be used. Many different types of filler materials may also be used.

The essential part of the present invention is in the use of orthonitrobiphenyl as both a blending and a plasticizing agent, the minor ingredients mentioned and the filler being merely incidental in the conventional process of molding products such as phonograph records.

Previously, when corn protein was made into moldable compositions, water or alcohol has been generally used as a dispersing agent. These dispersing agents have the disadvantage that they must be removed from the composition before it is finally molded. Orthonitrobiphenyl, on the other hand, provides not only an improved dispersing agent but also serves as a plasticizer in the final product and, therefore, does not have to be removed before the material is molded.

Another important improvement lies in the fact that the premix made as above described is lower in viscosity than one made with water, and this permits the premixing operation to be accomplished in various available types of mixing equipment and under wider ranges of temperature.

With the dispersing agents previously used, compositions containing corn protein and resins such as the resinous extract of pinewood have been difficult, if not impossible, to process properly with ordinary equipment for the making of phonograph records. With previously used dispersing agents, the compound tended to stick to the walls of the mixing equipment and was otherwise difficult to handle. With the present invention, the process of making molded products from these materials is greatly facilitated and makes practical many molding operations that once were impractical to carry out.

There has thus been described an improved process for blending corn protein material with the gasoline insoluble, aromatic hydrocarbon soluble resinous extract of pinewood. It will be noted that all of the resin in the final composition may be blended with the protein in the premixing operation, if desired. There has also been described an improved product since the blending agent, orthonitrobiphenyl, is not volatilized either during the final mixing operation or in a subsequent molding operation. The orthonitrobiphenyl has the function of being a plasticizer in the final product. When phonograph records are molded, the product is made by molding a quantity of the composition illustrated in part B of the example, under heat and pressure, as is usual in this art. If a molded product other than a phonograph record is desired, the ingredients of part A only, of the example may be used and within the ranges indicated in connection therewith. One or more of the additional ingredients listed in part B of the example may be included also depending upon the type of product being made and the speed and ease of molding desired.

We claim as our invention:

1. A molded article made of a composition comprising 30 to 60 parts corn protein, 37.5 to 60 parts of the gasoline insoluble, aromatic hydrocarbon soluble resinous extract of pinewood and 2.5 to 12 parts orthonitrobiphenyl.

2. A molded sound record comprising 5.4 to 16.8% corn protein, 6.75 to 31.8% of the gasoline insoluble, aromatic hydrocarbon soluble resinous extract of pinewood, 0.45 to 3.36% orthonitrobiphenyl, 0.5 to 2% of a metallic salt of a long chain fatty acid, up to 5% carbon black, 0.5 to 3% wax, up to 3% copal gum and 60 to 70% filler.

3. A molded sound record comprising zein about 7.4%, the gasoline insoluble, aromatic hydrocarbon soluble resinous extract of pinewood about 20.1%, orthonitrobiphenyl about 2%, zinc stearate about 1.0%, carbon black about 2%, wax about 1%, copal gum about 1%, and filler about 65.5%.

4. A molding composition containing a ratio of 30 to 60 parts corn protein, 37.5 to 60 parts of the gasoline insoluble, aromatic hydrocarbon soluble resinous extract of pinewood, and 2.5 to 12 parts orthonitrobiphenyl.

5. A molding composition suitable for making phonograph records comprising 5.4 to 16.8% corn protein, 6.75 to 31.8% of the gasoline insoluble, aromatic hydrocarbon soluble resinous extract of pinewood, 0.45 to 3.36% orthonitrobiphenyl, 0.5 to 2% of a metallic salt of a long chain fatty acid, up to 5% carbon black, 0.5 to 3% wax, up to 3% copal gum and 60 to 70% filler.

6. A method of preparing a molding composition comprising making a premix comprising 30 to 60% corn protein, 37.5 to 60% of the gasoline insoluble, aromatic hydrocarbon soluble resinous extract of pinewood and 2.5 to 12% orthonitrobiphenyl, said premix being blended at elevated temperatures, allowing said premix to cool, then adding to 18 to 28% of said premix, up to 15% additional of said resinous extract of pinewood and 60 to 70% filler and mixing until blending is complete.

LAWRENCE A. WOOD, Jr.
EUGENE D. O'MAHONY.

REFERENCES CITED

The following references are of record in the file of this patent:

UNITED STATES PATENTS

| Number | Name | Date |
| --- | --- | --- |
| 840,932 | Goldsmith | Jan. 8, 1907 |
| 2,284,091 | Hunter | May 26, 1942 |